US007089452B2

(12) United States Patent
Rubin et al.

(10) Patent No.: US 7,089,452 B2
(45) Date of Patent: Aug. 8, 2006

(54) METHODS AND APPARATUS FOR EVALUATING OPERATIONAL INTEGRITY OF A DATA PROCESSING SYSTEM USING MOMENT BOUNDING

(75) Inventors: Arthur Leonard Rubin, Brea, CA (US); Timothy Robert Schempp, Anaheim, CA (US)

(73) Assignee: Raytheon Company, Waltham, MA (US)

( * ) Notice: Subject to any disclaimer, the term of this patent is extended or adjusted under 35 U.S.C. 154(b) by 556 days.

(21) Appl. No.: 10/255,029

(22) Filed: Sep. 25, 2002

(65) Prior Publication Data
US 2005/0015680 A1 Jan. 20, 2005

(51) Int. Cl.
*G06F 11/00* (2006.01)
(52) U.S. Cl. .................... 714/32; 342/357.02; 701/214
(58) Field of Classification Search ................ 701/214
See application file for complete search history.

(56) References Cited

U.S. PATENT DOCUMENTS

| 5,760,737 | A | * | 6/1998 | Brenner ................. 342/357.02 |
| 5,910,788 | A | * | 6/1999 | Class .................... 342/357.02 |
| 6,067,484 | A | * | 5/2000 | Rowson et al. ............... 701/16 |
| 6,134,484 | A | * | 10/2000 | Geier et al. ................... 701/13 |
| 6,151,551 | A | * | 11/2000 | Geier et al. .................. 701/207 |
| 6,266,323 | B1 |  | 7/2001 | Valko et al. ................. 370/230 |
| 6,429,808 | B1 | * | 8/2002 | King et al. ............ 342/357.02 |
| 6,603,426 | B1 | * | 8/2003 | Clark ..................... 342/357.06 |

OTHER PUBLICATIONS

Walter et al. "An integrity equation for use with space based augmentation systems." presented at GNSS-97, Munich, Germany, Apr. 1997. retrieved from http://waas.stanford.edu/pubs/index98.htm on Aug. 23, 2005.*
Shively et al. "An overbound concept for pseudorange error from the LAAS ground facility." presented at ION Jun. 26-28, 2000. retrieved from http://www.mitrecassd.org/proj/satnav/ on Aug. 23, 2005.*
International Search Report.
Proc. ION GPS; Proceedings of ION GPS 1997, Inst. Of Navigation, Alexandria, VA; vol. 2, 1997, pp. 1583-1592, XP009035512 pp. 1586-1591.
Decleene, B.: "Defining Pseudorange Integrity—Overbounding" ION GPS 2000, Sep. 2000, pp. 1916-1924, XP009035516 Salt Lake City, cited in the application pp. 1916-1924.

* cited by examiner

*Primary Examiner*—Robert Beausoliel
*Assistant Examiner*—Philip Guyton
(74) *Attorney, Agent, or Firm*—BainwoodHuang

(57) ABSTRACT

Mechanisms and techniques provide a system to evaluate operational integrity of a data processing system such as an area augmentation system by obtaining at least one set of distribution data related to information processed by the data processing system. The set(s) of distribution data can include corrections information and integrity bounds information related to the corrections information. The system applies a moment generating function to the set of distribution data to produce a moment bounded distribution data result and compares the moment bounded distribution data result to an integrity limit to determine if the data processing system operates within an acceptable integrity threshold. The system can be used in real-time or non-real time with sets of distribution data that are non-Gaussian, non-symmetric and/or non-unimodal.

32 Claims, 7 Drawing Sheets

METHODS AND APPARATUS FOR EVALUATING OPERATIONAL INTEGRITY OF A DATA PROCESSING SYSTEM USING MOMENT BOUNDING

FIELD OF THE INVENTION

The present invention generally relates to systems, mechanisms and techniques for insuring the operational integrity of data processing systems.

BACKGROUND OF THE INVENTION

Many conventional implementations of data processing systems require that such systems operate with a high level of integrity. As an example, a data processing system such as a computer-based vehicle navigation, operation or control system must operate with a sufficient level of integrity and accuracy such that the designers and operators of such a system can trust the system to perform properly in order to avoid hazardous conditions (e.g., the production of hazardously misleading information) which may endanger human life or property. Due to the complexity of modem day computerized data processing systems such as signal-based vehicle navigation systems, performing a verification process to determine that such systems operate at a required level or threshold of integrity can be problematic for system designers.

As an example, consider a conventional data processing system such as a Global Positioning System (GPS) that vehicles or individuals might use for navigation purposes. Generally, a GPS system includes a constellation (e.g. twenty-four or more) of GPS satellite space vehicles that orbit the earth. Each GPS satellite continually transmits, from space, specially coded GPS satellite signals (i.e., radio signals) that GPS receiver devices in vehicles or carried by individuals can receive and process. According to a specific orbital arrangement of the GPS satellites around the earth, a GPS receiver device positioned in the air or on the surface of the earth is provided with between five and eight different visible (i.e., receivable) GPS satellite signals from respective orbiting GPS satellites. By receiving and processing GPS satellite signals from four or more GPS satellites according to certain GPS navigation algorithms (e.g., by measurement of code-phased arrival times of four different GPS signals), a GPS receiver device can compute an estimate of the receiver device's position in three dimensions (e.g., altitude, latitude and longitude or X, Y and Z), an estimate of the receiver device's velocity (if the receiver is moving), and a time offset for a clock operating within the receiver device based on satellite clock information in the GPS signals.

Navigation in three dimensions is the primary function of conventional GPS systems and receivers designed for navigation are manufactured by various vendors for use within aircraft, ships, ground vehicles, and for hand carrying by individuals. In addition, the GPS system may be used for positioning purposes, time dissemination, surveying and geographic research (e.g., studies of plate tectonic movement) as well.

SUMMARY OF THE INVENTION

Though the conventional GPS system is widely used for many navigation purposes, its accuracy for use in navigation or vehicle guidance requiring precise control or in situations upon which human life or property are dependent is somewhat limited. As an example, use of GPS navigation as a primary or sole means of controlling a level flight or an approach of an aircraft while landing on the ground is not yet accepted by airspace governing organizations such as the United States Federal Aviation Administration (FAA). The reluctantcy to use the GPS system in such situations is due to the fact that the GPS system is susceptible to various sources of error.

A typical conventional GPS receiver using conventional GPS signals can compute its position to within plus or minus 30 meters from its actual or true location. However, this positional accuracy can be affected by errors from a number of different sources. There may be ionospheric errors, satellite orbit errors, clock errors and/or other possible sources of error that either alone or in combination with each other can affect the accuracy of a computed position of a receiver device. As an example, there may exist ionospheric delays (e.g., up to 70 nanoseconds) in signal propagation from one or more GPS satellites to a GPS receiver device as the GPS signal passes through the ionosphere (a layer of the earth's atmosphere ranging in altitude from 50 to 500 kilometers that consists of ionized air). This delay can effect a GPS receive device's perception of a time sequence within the GPS signal that might result in computed positional errors of up to 10 meters in any direction. If such ionospheric errors happen to exist for multiple satellite signals being received by a GPS receiver, the errors may convolve when performing positional computations to produce a large miscalculation in the receiver's position. In other words, errors from many sources may combine to produce larger errors. Other sources of error such as satellite clock synchronization errors and/or satellite orbit data errors may exist as well that can affect a GPS receiver's navigational computation of position by, for example, one meter in direction. Again, such errors may combine to form larger errors in the positional computation of the receiver. Further still, there may be other sources of bias or error in data processing system as well. As an example, multipath errors may occur in GPS systems in which a GPS signal reflected off an object (e.g., a mountain or building) introduces delay into the signal and a receiver device mistakes the reflected signal to be the signal sent directly from the satellite. Such sources of error can have further adverse effects on position computation.

Accordingly, many complex data processing systems, of which the aforementioned signal-based navigations systems are an example, may have a multitude of error sources that produce small variations that the data processing system may combine to produce larger errors. Conventional attempts to account for such errors provided a means in the system to perform a Root Sum Square (RSS) integrity estimate on the combined sources of error to produce a composite error bound. However, when the safety of human life and/or property is critical, it cannot be assumed that the Root Sum Square error bounding technique always operates to properly bound integrity estimates within an acceptable integrity threshold without significant analysis to back the claim. As such, embodiments of the invention are based in part on the observation that a process is required to insure that every possible combination of errors is "bounded" by integrity estimates produced in safety or mission-critical data processing systems.

Returning to the discussion of signal-based navigation data processing systems such as the GPS system, systems designers have developed various data processing systems that operate in conjunction with conventional GPS systems to significantly reduce computational errors introduced by one or more of the aforementioned error sources. In particular, the United States Federal Aviation Administration has commissioned the design and implementation of system referred to as a Wide Area Augmentation System (WAAS) to help minimize errors encountered in the use of an aircraft navigation system based on GPS. The WAAS is a conventional real-time system that samples a collection of satellite GPS signals over a geographical area (e.g., the United States) and produces corrections and integrity information related to those signals for the various sources or error that can effect those GPS signals. As an example, WAAS provides ionospheric vertical delay calibrations to GPS signals from satellites that are nominally accurate to within 50 centimeters or better for a user (e.g., an aircraft) flying over the United States. Without the WAAS in operation, uncalibrated ionospheric delays can reach 40 meters during solar maximum. Conventional operation of the WAAS system thus significantly reduces error or bias due to sources of error such as ionospheric delay, satellite orbit errors, and satellite clock synchronization errors.

To accomplish this, the WAAS system includes a number of stationary ground-based GPS receiver stations (25 in one implementation) referred to as Wide-area Reference Stations (WRSs) that are physically distributed across geographical regions of the United States and its territories. Each WRS includes three independent (i.e., redundant) sets of Wide-area Reference Equipment (WRE) that each operate as an all-in-view dual-frequency GPS receiver. Each WRE also operates a cesium clock. At any moment in time, each WRS (i.e., each of the three independently operating WREs in a WRS) may be capable of receiving, for example, eight to twelve GPS satellite signals. Each WRE operating within each WRS transmits the GPS satellite signal measurements over ground-based or other communication lines (e.g., high-speed optical data communications links) for receipt by two Wide-area Master Stations (WMSs).

Each WMS includes two corrections processors and two safety processors that operate in a redundant manner. Each corrections processor in each WMS chooses one WRE input signal from each WRS that has at least two working sets of WREs from which GPS signal corrections information and integrity estimates are calculated. More specifically, for each satellite in view of the WAAS, each corrections processor uses the set of WRE signals (up to 12 different signals, one from each WRS that can see a particular satellite) to calculate corrections related to satellite orbit, satellite clock synchronization and ionospheric vertical delays for GPS signals coming from that satellite. The corrections processor further calculates an integrity estimate or integrity bounds information for each of these corrections that generally indicates or characterizes a level of confidence that the WAAS system places in its corrections information. As an example, if many (e.g., 12) WRSs can receive signals from a single satellite, then there are many reference signals from which WAAS can compute corrections information and thus the integrity bounds for that corrections information for each error source may be quite low. In an alternative, if only a few (e.g., 4) WRSs can see the signals from a particular satellite, then the integrity bounds related to the signal corrections information for that satellite might be higher indicating less confidence in the corrections.

Once the corrections processors have computed the required signal corrections and integrity information, redundant safety processors included within each WMS operate to compare the output of each corrections processor to verify that they are in reasonably close agreement. Assuming each redundant corrections processor produces a consistent result, a message output processor within a master WMS prepares a WAAS message containing the signal corrections and integrity bounds information for transmission (i.e., uplink) to another satellite system referred to as the Geostationary Earth Orbit (GEO) satellite system that currently consists of two geo-stationary satellites positions over the United States. A GEO Uplink System (GUS) processor receives the WAAS GPS corrections information and integrity bounds message (e.g., WAAS messages) from the master WMS and transmits this message via a radio uplink transmission to the two stationary GEO satellites positioned over the United States. The GEO satellites re-broadcast this message containing the WAAS calculated GPS signal corrections and integrity estimates information to GPS users (e.g., aircraft in flight) for receipt, for example, using a bent-pipe transponder. The GUS maintains (e.g., advances) the uplink signal timing such that relayed WAAS signal corrections and integrity bounds messages received at each GPS user appear as if they were a GPS signal originating from the GEO satellites, and thus the GEO satellites appear to users as GPS satellites.

Using the aforementioned WAAS messages, GPS users that are WAAS-capable can use the error correction and integrity bounds information to significantly reduce combined and convolved error calculations for clock errors, satellite orbit errors, and ionospheric delay errors in order to more accurately compute the position of that receiver device. As an example, for ionospheric delays, specialized WAAS ionospheric software operates in the correction processors to estimate the delays over a set of earth-fixed grid points that are spread out over the geographic coverage area (e.g., the United States). The delay in each grid location is broadcast to users who can then estimate the delay at their position within the grid.

Embodiments of the invention are based in part on the observation that during the operation of a data processing system such as the WAAS, a process is required to insure that every possible combination of errors is bounded by integrity estimates that the WAAS system produces. The integrity estimates represent a confidence bound on how accurate the WAAS error correction data is for a particular satellite. As an example, integrity estimate or bounds information for particular satellite might indicate how well-viewed that specific GPS satellite is by a number of different WRS ground stations. As another example, if there is very little ionospheric signal delay as GPS signals pass through a patch of the ionosphere over Denver, Colo., then the integrity data for this corrections information might indicate a low level of confidence for portions of the ionosphere over Denver at that point in time. The integrity bounds information thus represents a gauge of how accurate the corrections signals are when computed by the WAAS system. A user such as an aircraft that receives the WAAS messages can, for example, apply all of the corrections information to any "visible" GPS signals and can use the integrity information to compute a combined integrity estimate in order to put a horizontal bound on the error in the signal corrections. If the error produced exceeds a predetermined threshold, then the aircraft can be configured to discontinue use of the GPS system for navigation and must switchover to a more conventional means of navigation (e.g., pilot navigation).

Conventional attempts at solving the problem of insuring that every possible combination of errors is bounded by the WAAS integrity estimate information have proven to be quite difficult. In particular, one conventional attempt at solving this problem has been addressed by the International Civil Aviation Organization (ICAO) using a technique called "overbounding." The conventional overbounding approach is documented in detail in a paper entitled "Defining Pseudorange Integrity—Overbounding" written by Bruce DeCleene and published in September 2000 edition of the ION GPS Proceedings. The entire teachings and contents of this paper are hereby incorporated by reference herein.

One problem with the conventional technique of overbounding, such as that described in the aforementioned paper, is that the overbounding technique only addresses situations where underlying sets of distribution data are unimodal, symmetric and zero mean. This is often the case for theoretical work. However, embodiments of the present invention are based in part on the observation that data distributions such as measurements of GPS signals, even over long periods of time, often do not have these qualities. Accordingly, embodiments of the invention are based in part on the observation that a process is required to insure integrity with high confidence in a system such as WAAS using actual observed sets of distribution data that are non-unimodal, non-symmetric and non-zero-mean. That is, embodiments of the invention make no assumptions about the underlying distributions of data and thus make for an ideal approach to dealing with non-unimodal, non-symmetric and non-zero-mean data distributions collected from actual observation and computation (in real-time or otherwise) of operations of real data processing systems such as WAAS.

In particular, embodiments of the invention provide methods and apparatus for evaluating the operational integrity of a data processing system such as, for example, WAAS or similar area augmentation systems using an application of moment generating functions. In particular, embodiments of the invention provide an analysis technique for proving that a data processing system such as WAAS meets its integrity requirements. To do so, embodiments of the invention provide a method for evaluating operational integrity of a data processing system. In one embodiment, the method comprises the steps of obtaining at least one set of distribution data related to information processed by the data processing system. The set of distribution data may be, for example, GPS satellite signal measurement data from a plurality of ground-based WREs operating in the WRS's of the WAAS and may include satellite signal corrections information and integrity information related to the corrections information. The method embodiment applies a moment generating function to the set of distribution data (to one or more sets) to produce a moment bounded distribution data result. The method then compares the moment bounded distribution data result to an integrity limit to determine if the data processing system operates within an acceptable integrity threshold. Embodiments of the invention can operate in real time to continuously verify correction operation of the system, or may operate in non-real time during a testing, design or verification phase of the data processing system.

Using the moment generating function, embodiments of the invention place no restrictions on underlying sets of distribution data to which this technique may be applied and are thus suitable for use in validating integrity estimate operation in a variety of engineering applications in which a generic linear system takes independent inputs and for which included with the input data are integrity bounds on each specific input. The linear parameters may be sent by any means not depending on the input data. Embodiments can thus be used to prove that for a safety-critical application such as the WAAS, a calculated integrity limit always exceeds the overall output with a high confidence value.

In another embodiment of the invention, the set(s) of distribution data include multiple sets of distribution data, each of which is non-unimodal, non-symmetric (i.e., having a non-zero mean) and/or is distribution data collected from actual operation of the data processing system (i.e., is real data). As such, embodiments of the invention allow application to real-world systems that produce real world data instead of theoretical simplifications of such systems.

In yet another embodiment, the distribution data includes at least one integrity estimate that forms a composite error bound. In addition, the steps of applying the moment bounding function and comparing the moment bounded distribution data result determine that every possible combination of errors represented within the distribution data is bounded by at least one integrity estimate. This ensures that the system operates within an acceptable integrity threshold.

In a further embodiment, the data processing system is a signal-based navigation system such as WAAS or a variant thereof (i.e., the invention can be applied, for example, to other area augmentation systems in operation in other parts of the world). In addition, the at least one set of distribution data includes corrections information and integrity estimate information related to a location of a user of the signal-based navigation system. In this embodiment, the steps of applying a moment generating function and comparing the moment bounded distribution data result collectively perform a convolution analysis operation on the set of distribution data such that the moment generating function produces a resultant moment bounded distribution data result that ensures that combinations of errors represented in the integrity estimates and corrections information in the set of distribution data do not exceed the integrity limit that accounts for all combind errors in the set of distribution data obtained from the signal-based navigation system. In this manner, application of the moment bounding functions takes into account real world data.

In other embodiments the signal-based vehicle navigation system can be one of the following; a wide area augmentation system, a local area augmentation system, and a global navigation satellite system.

In another embodiment, the corrections information and integrity estimate information included in the set of distribution data relate to sources of navigation error in the signal-based navigation system that includes at least satellite orbit error, satellite clock error, and satellite signal ionospheric delay error. Thus the invention can verify proper integrity estimates for corrections information for such sources of error.

In a further embodiment, the method performs the steps of obtaining, applying and comparing during real-time operation of the data processing system. The step of obtaining comprises the step of obtaining the at least one set of distribution data from real-time operation of the data processing system such that the steps of applying and comparing ensure that operation of the data processing system is within an acceptable integrity threshold. This embodiment thus continually verifies correct operation of a data processing system in real-time or near-real-time.

Another embodiment of the invention performs the step of obtaining at least one set of distribution data during a real-time operation of the data processing system to collect at least one sample set of distribution data. In addition, this embodiment performs the steps of applying and comparing in non-real-time operation of the data processing system on the sample set(s) of distribution data to prove that the data processing system operates within an acceptable integrity threshold. This allows embodiments of the invention to be applied during design, test and verification of engineering systems that provide integrity information that forms a bound on operation of the system.

In another embodiment, in addition to application of the moment generation function, the embodiment can further apply a Gaussian distribution function to at least one set of distribution data to produce a Gaussian bounded distribution data result and can compare the Gaussian bounded distribution data result to an integrity limit to determine if the data processing system operates within an acceptable integrity threshold. In this manner, in addition to the moment bounding function, a Gaussian distribution function can be used to provide additional verification of correct operation of the system. Gaussian distribution functions require that the distribution data be unimodal, symmetric and zero-mean, and an example of application of a Gaussian function is the overbounding approach presented in the DeCleene paper discussed above. Thus, this embodiment of the invention applies the moment bonding technique in addition to a Gaussian distribution function (of which the DeCleene overbounding technique is a variant) in order to do a "double" verification technique.

According to a further embodiment of the invention, a method applying an overbounding distribution function (e.g., the DeCleene overbounding approach) to at least one set of distribution data to produce an overbounded bounded distribution data result and compares the overbounded bounded distribution data result to an integrity limit to determine if the data processing system operates within an acceptable integrity threshold. As in the aforementioned embodiment, this provides a double check and combines the overbounding technique with the moment bounding technique described herein to verify correct operation of a data processing system such as a signal-based navigation system.

In yet another embodiment, the step of obtaining at least one set of distribution data comprises the steps of operating the data processing system to produce a plurality of sets of distribution data, each having a respective associated integrity estimate. In addition, the step of applying the moment generation function comprises the step of computing a respective moment bounded distribution data result based on the respective associated integrity estimate for each of the plurality of sets of distribution data by adjusting input values to the moment generating function such that the respective integrity estimate of each set of distribution data is moment-bounded. Furthermore, the step of comparing the moment bounded distribution data result to an integrity limit comprises the steps of ensuring that each respective moment bounded distribution data result produces at least one value that is moment-bounded and ensuring that each respective moment bounded distribution data result produces at least one value that is moment-bounded below the acceptable integrity threshold. Details of these operations are explained below and provide for verification that the data processing system is operating (or can operate in the case of non-real time) with an acceptable integrity threshold.

In a further embodiment, the step of applying a moment generation function comprises the steps of selecting input values to the moment generating function such that a first and a second condition are both satisfied, wherein the first condition is that all input distributions in the set(s) of distribution data are moment-bounded and the second condition is that a root sum square of integrity estimates associated with each of the set(s) of distribution data are less than or equal to a probability of failure (e.g., an acceptable integrity threshold). As will be explained, by ensuring that each distribution is moment bounded, and is below the acceptable integrity threshold, operation of the data processing system on sets of real distribution data can be verified.

In a further embodiment, the step of comparing comprises the step of determining that the data processing system operates within an acceptable integrity threshold if the probability that a sum of set(s) of distribution data is greater than an integrity limit, is less than the probability of failure associated with the acceptable integrity threshold.

In a further embodiment, the steps of applying a moment generation function and comparing the moment bounded distribution data result to an integrity limit collectively determine that:

$$P\left(\left|\sum_{i=1}^{N} k_i J_i\right| > K_{limit} \sqrt{\sum_{i=1}^{N} (k_i \sigma_1)^2}\right) \leq P_{fail}$$

where P is a probability function, $J_1$ represents a set of distribution data, N is a number of individual inputs J, such as a number of satellites, $k_1$ is a set of N real numbers, $\sigma$ represents an integrity limit associated with each $J_i$, and $P_{fail}$ represents the probability of failure associated with the acceptable integrity threshold. The above equation will be explained in detail and this embodiment allows verification that the data processing system maintains the inequality in the above equation for any inputs to the data processing system.

In another embodiment, $$K_{limit} \sqrt{\sum_{i=1}^{N} (k_i \sigma_1)^2}$$

(i.e., from the aforementioned equation) is an integrity limit that accounts for combine error from each J within $J_1$.

In a further embodiment, the step of applying a moment generating function to the at least one set of distribution data to produce moment bounded distribution data result comprises the step of applying a moment generating function of X, $m_x(t)$ defined as:

$m_x(t) = E(e^{t \cdot X}) = \int e^{t \cdot u} p_x(u) du$ where $p_x(u)$ is a probability density function of random variable X, such that X is (K, $\sigma^2$)-moment bounded if $m_x(t)$ exists and is $\leq K \cdot e^{t^2 \alpha^2 / 2}$ for all real numbers t. $Ke^{t^2 \alpha^2 / 2}$ is the moment generating bound.

In yet another embodiment, there exists at least one source of error to the data processing system and there are $J_1$ sets of distribution data containing $k_1$ real numbers that represent input to the data processing system that are collected for each respective source of error to the data processing system. In addition, each of the source(s) of error has a set of respective set of associated integrity values $\sigma_{J_i}$ that represent an integrity limit associated with each $J_i$. In addition, the step of applying a moment generation function to the set(s) of distribution data comprises the step of computing the moment generating function $m_{J_i}(t)$ of each set of distribution data and selecting input values K and $\alpha$ to the moment generating bound such that:

I) all $J_i$ are (K, ($\alpha \cdot \sigma^2$))-moment bounded; and

II) such that $2K^N e^{(K_{Limit}/\alpha)^2} \leq P_{fail}$, where:

K and $\alpha$ are numerical input values to the moment generating function, $K_{Limit}$ defines a size in $\sigma$ units of a critical error, e represents a base of natural logarithms, and $P_{fail}$ is a value of the acceptable integrity threshold. In a graph of K and α, Condition I thus produces a moment bounded distribution data result curve and condition II produces a curve for the acceptable integrity threshold. If there is at least one point on each curve for each set of distribution data for condition I that is below the curve of condition II, then this embodiment of the invention has shown the data processing system to be operating safely.

Other embodiments of the invention include a data processing system, such as a computerized or electronic device or set of such devices working in conjunction with each other, a workstation, a handheld or laptop computer, or other such device or devices configured with software and/or circuitry to process all of the method operations disclosed herein as embodiments of the invention. In such embodiments, the data processing system includes a communications interface (e.g., a network interface for receiving data such as the sets of distribution data), a memory (e.g., any type of computer readable medium), a processor and an interconnection mechanism connecting the communications interface, the processor and the memory. In such embodiments, the memory system is encoded with an integrity verification application that when performed on the processor, produces a integrity verification process that causes the data processing system to perform any and/or all of the method embodiments, steps and operations explained herein as embodiments of the invention to verify that the data processing system operates within an acceptable integrity threshold. In other words, a computer that is programmed to operate as explained herein is considered an embodiment of the invention. It is to be understood that the integrity verification system can operate as part of the data processing system for which it verifies correct operational integrity, or embodiments of the invention may operate independently and/or separately (e.g., as a separate system) from the data processing system that is verified.

Other arrangements of embodiments of the invention that are disclosed herein include software programs to perform the method embodiment steps and operations summarized above and disclosed in detail herein. As an example, an integrity verification software application configured to operate as explained herein is considered an embodiment of the invention. More particularly, a computer program product is disclosed which has a computer-readable medium including computer program logic encoded thereon that, when executed on at least one processor with a computing system, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system, a data processing system or other device to cause the computer system to perform the techniques explained herein as embodiments of the invention.

It is to be understood that the system of the invention can be embodied strictly as a software program, as software and hardware, or as hardware or circuitry alone and may be a combination of such elements in a single device or distributed within a system such as WAAS or an equivalent system.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
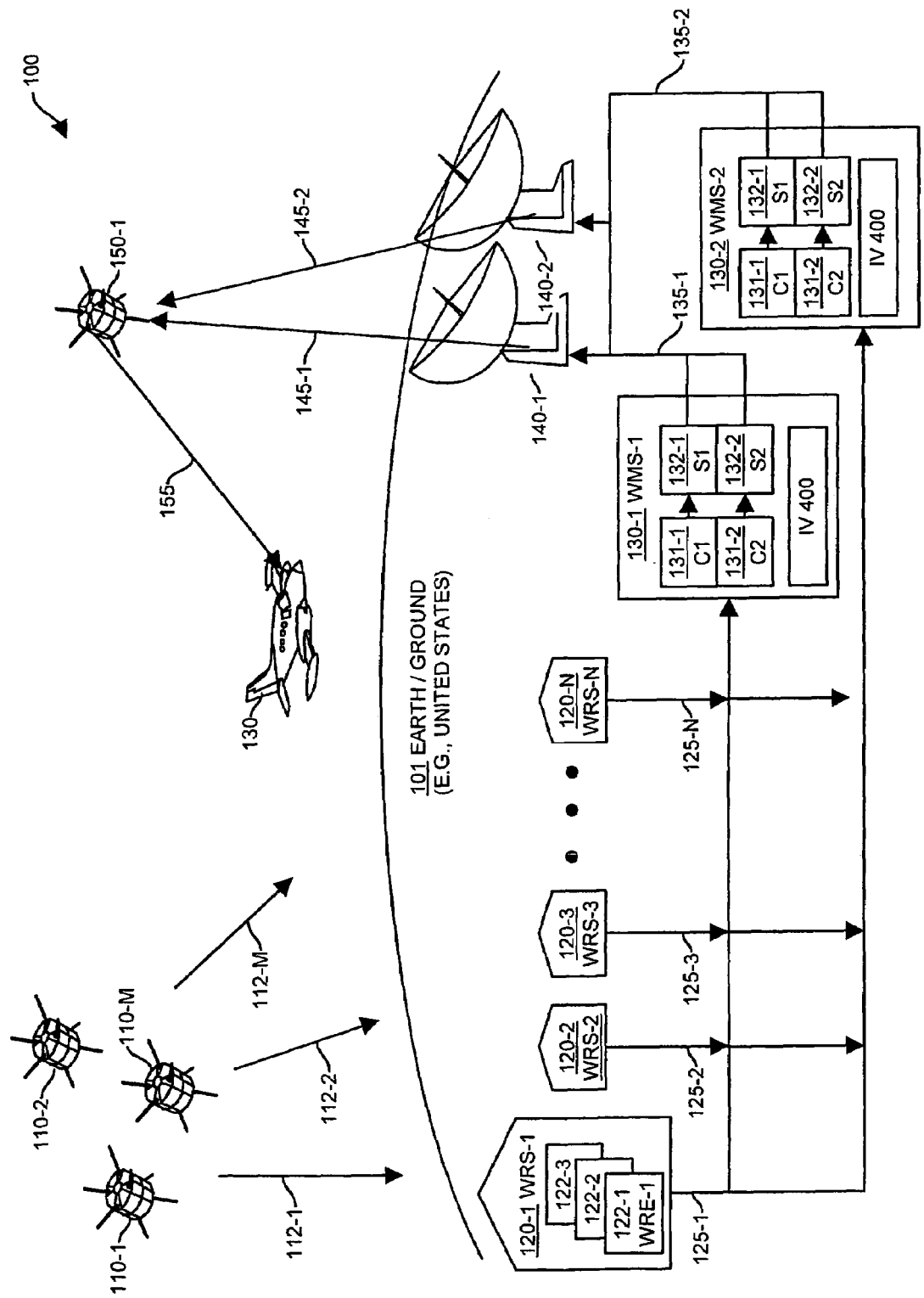
FIG. 1 illustrates an example data processing system environment 100 that includes a GPS system operating in conjunction with a WAAS configured with an integrity verification process operating in accordance with one embodiment of the invention.

Embodiments of the invention provide mechanisms and techniques for evaluating and confirming an operational integrity of a data processing system. The data processing system may be any type of system that processes data to produce an output. During operation of such a data processing system, one or more sources of the error may combine to produce combined or convolved errors within the output of the system. To help reduce such errors, such systems to which the invention may be applied also produce one or more integrity estimates that attempt to provide a composite error bound on the output data. Embodiments of the invention can be utilized to analyze and confirm proper operation of such systems to determine whether or not every possible combination of errors represented within the distribution of input data is bounded in the output by the integrity estimates for one or more particular sources of error.

Generally, embodiments of the invention operate by obtaining at least one set of distribution data related to information processed by the data processing system. Since embodiments of the invention obtain or collect the distribution data from operation of the data processing system, the sets of distribution data are real or actual processed data. As such, the real set of distribution data may be non-unimodal and may be non-symmetric (i.e., having a non-zero mean). Conventional systems and techniques that attempt to validate operational integrity of generic linear data processing systems are unable to properly or most accurately validate correct operation of such systems in all circumstances using real data due to the inability to apply conventional integrity confirmation techniques such as overbounding or Gaussian bounding approaches to sets of real distribution data that are non-unimodal and/or non-symmetric. Embodiments of the invention substantially overcome this problem and apply a moment generating function to the set(s) of distribution data to compute or produce a moment bounded distribution data result for each sample set of distribution data for each source of error having specific integrity estimates or values associated with it. During application of the moment generating function, to determine if the data processing system operates within an acceptable integrity limit or threshold, embodiments of the invention attempt to select input values to the moment generating function such that every possible combination of errors represented within the distribution data for a particular error source is bounded by an acceptable integrity threshold or limit. The integrity limit thus represents a maximum value related to the collective set of errors represented within the at least one set of distribution data. In one embodiment, the integrity limit maximum value is a maximum value of convolved errors in the distribution data.

Embodiments of the invention can be applied to many engineering applications in which the operational integrity of a data processing system must be validated either initially (e.g., during a testing phase of the data processing system) or continually during real-time operation of the data processing system. As an example, embodiments of the invention can be successfully applied to signal-based navigation systems such as those used in aviation navigation applications in which one of the most critical requirements is correct operational integrity. In particular, within the realm of GPS navigation, since the performance of a system such as GPS can vary dramatically depending upon satellite geometry (e.g. orbit) errors, clock synchronization errors and ionospheric error causing conditions, mathematical bounds on such sources of error have been defined by governing organizations such as the International Civil Aviation Organization (ICAO). Specifically, acceptable integrity thresholds have been defined for such things as horizontal and vertical protection levels to be applied during navigation based upon a satellite signal-based navigation system that operates in conjunction with an augmentation system such as the Wide Area Augmentation System (WAAS).

FIG. 1 illustrates a data processing system 100 that includes a signal-based navigation system 100 such as a GPS system that operates in conjunction with a WAAS, to provide satellite signal corrections information for sources or error, as well as integrity estimate information for each correction, to aircraft users (e.g., 130) utilizing the system 100 for navigational purposes. As will be explained in this example, one embodiment of the invention can operate to ensure that the system 100 in FIG. 1 operates within an acceptable integrity threshold or limit. It is to be understood that embodiments of the invention can operate in real-time to continually evaluate the operational integrity of the GPS/WAAS system or can operate in non-real-time to verify correct operational integrity during a testing and/or design phase of a system such as that shown in FIG. 1.

In this example, the GPS and WAAS system 100 includes the plurality of GPS satellites 110-1 through 110-M that orbit the earth 101 according to a predefined arrangement. A geo-stationary GEO satellite 150 (only one shown in this example, there may be others) is also positioned above the earth 101 and operates both as a GPS satellite and a relay satellite as explained below. Positioned around the earth 101 are a plurality of Wide-area Reference Stations 120-1 through 120-N (WRSs). The WRSs 120 may be distributed, for example, across the geographic United States and in other areas (e.g., Alaska and Hawaii) and are capable of receiving GPS range signals 112-1 through 112-M from many GPS satellites 110 that are "in view" (i.e., not over the horizon) for that WRS 120. There may be, for example, twenty-five (N=25) WRSs 120 positioned throughout the United States and its territories and each me be able to receive signals from eight to twelve different GPS satellites 112 at any given time.

Each WRS 120 includes, in this example, three independent and redundant sets of Wide-area Reference Equipment (WRE) 122 (122-1 through 122-3 in each WRS 120) that each operate an all-in-view dual-frequency GPS receiver with its own cesium clock. GPS signal 112 measurements from all WREs 122 at all WRSs 120 are transmitted over high speed communications links 125 to two (in this example) Wide-area Master Stations (WMS) 130-1 and 130-2 that operate redundantly to each other.

Each WMS 130 operates two corrections processors C1 131-1 and C2 131-2 and two safety processors S1 132-1 and S2 132-2. Each corrections processor 131 selects one distinct signal from one WRE 122 from each WRS 120 and calculates corrections and integrity information on this signal for different sources of error that can affect the integrity of the GPS satellite signals 112. The corrections processors 131 perform the corrections and integrity calculations processing for each WRS 120 that has at least two operational WREs 122. In particular, measurements from two frequencies are processed: a GPS Standard Positioning Service L-band ranging signal (L1) frequency at 1575.42 MHz and the GPS Precision Positioning Service L-band ranging signal (L2) frequency at 1227.6 MHz. The corrections processors 131 perform computations to calculate WAAS GPS signal corrections for various sources or error including errors in the orbits of the GPS and GEO satellites 110 and 150 (orbit errors), clock synchronization errors for the satellites 110 and 150, and the ionosphere vertical delay errors at the L1 frequency.

The safety processor 132 calculates an integrity estimate or integrity bounds information for each of these corrections that generally indicates or characterizes a level of confidence that the WAAS system places in its signal corrections information. As an example, if many (e.g., 12) WRSs can receive signals from a single satellite 150, then there are many reference signals from which WAAS can compute corrections information and thus the integrity estimates for that corrections information for each error source may be quite high. In an alternative situation, if only a few (e.g., 4) WRSs 120 can see the signals from a particular satellite 150, then the integrity estimate information related to the signal corrections information for that satellite might be lower.

Each of the safety processor 132 (S1 and S2) performs an independent data verification (IDV) functionality that first compares the output of each corrections processor 131 to verify the outputs are in reasonably close agreement. In addition, each of the safety processor 132 (S1 and S2) monitor the corrections information produced by the corrections processors 131 to ensure that users 130 (aircraft in this example) are being provided with safe GPS signal error corrections and integrity information that accounts for errors introduced from the errors sources (e.g., satellite orbit error, clock synchronization error, and ionospheric error) in the system 100. Lastly, a message output processor (not specifically shown) associated with each safety processor 132 in each WMS 130 forms the WAAS message for uplink using the verified data from a master correction processor (e.g. C1 131-1). The two safety processors 132 then check their respective output from each other for an exact bit-by-bit match, although other matching procedures can be used. If the output matches, each WMS 130 passes the WAAS message containing the corrections information and integrity estimates to a GEO Uplink Subsystem (GUS) 140-1, 140-2 (e.g., ground-based satellite transponders) for uplink 145-1, 145-2 to one or more geo-stationary GEO satellite(s) 150-1. The GEO satellite(s) 150-1 then rebroadcast the signal 145-1, 145-2 containing the WASS message to user 130 such as an aircraft in this example (e.g., for receipt via bent pipe transponder). The GUSs 140 maintain timing of the uplink signals 145 such that it appears to users 130 as the WAAS message signals 155 originated from the GEO satellite 150.

In addition to the corrections processors 131 and safety processors 132, each WMS 130 operates an integrity verification process (IV) 400 configured in accordance with embodiments of the invention. As will be explained herein, operation of the integrity verification process 400 ensures that the data processing system 100 provides proper integrity estimates within the WAAS uplink messages 145 and that these integrity estimates and corrections data do not exceed an acceptable integrity threshold or limit. In particular, during calculation of integrity data by the safety processors 132 that indicates a confidence level in how accurate the corrections data is for GPS satellite signals 112, sources of error can combine to produce a significantly flawed results. Generally then, integrity verification process 400 can be considered a linear system which takes independent inputs and, included with the input data, are integrity bounds on each specific input. The linear parameters may be set by any means not depending upon the input data. For safety-critical applications such as the GPS data processing system 100, the integrity verification process 400 verifies or proves that the calculated integrity limit produced by the corrections processors 131 always conform to an acceptable integrity threshold with a high level of confidence.

The operation of the integrity verification process 400 of verifying or continually insuring that the integrity bounds information produced by the corrections processors 131 is always within an acceptable integrity threshold can be stated in mathematical terms as follows:

Let P be a probability function;

Let each $J_1$ represent a set of distribution data (e.g., input data into the system), for which there is one set for each source of error to the system 100 (e.g., one set for clock errors, one set for ionospheric errors, and one set for satellite orbit errors);

Let $\sigma_i$ represent an integrity limit associated with each $J_1$; and

Let N be a number of individual inputs J;

Let $k_1$ be a set of N real numbers;

Let $P_{fail}$ represents a probability of producing Hazardously Misleading Information (HMI) or in other words, the probability of failure associated with the acceptable integrity threshold. $P_{fail}$ may be set for the WAAS system by governing authorities (e.g., FAA), to be, for example, $10^{-7}$. Other values could be used as well, such as $10^{-9}$, in which case less probability of a hazard is allowed.

Furthermore, let $K_{Limit}$ be a constant specified by the application for which the embodiment of the invention is to ensure operation within an acceptable integrity limit. Generally, $K_{Limit}$ indicates or defines the size of a critical error in $\sigma$ units. By way of example, if embodiments of the invention are ensuring the an integrity threshold is met for a vertical (i.e., altitude) integrity requirement for the WAAS system, then $K_{Limit}$ may be set to 5.33. In an alternative configuration, $K_{Limit}$ may be set to 6.0 for a horizontal requirement for certain users such as aircraft 130 flying under a certain altitude, such as on an approach to a runway. As another example $K_{Limit}$ may be set to 6.18 for a horizontal integrity requirement for an aircraft user 130 that is simply flying level enroute (e.g., steady and over a certain altitude). Generally, the lower the $K_{Limit}$ value, the more critical the application or use of the data processing system. Embodiments of the invention are capable of proving that a data processing system 100 such as the WAAS system in FIG. 1 meets its integrity requirements for all input values.

Using the above definitions, in order for a data processing system 100 such as WAAS to be shown to operate safely by embodiments of the invention, embodiments of the invention determine that:

$$P\left(\left|\sum_{i=1}^{N} k_i J_i\right| > K_{limit} \sqrt{\sum_{i=1}^{N} (k_i \sigma_1)^2}\right) \leq P_{fail} \quad \text{Equation 1}$$

In Equation 1 above, the inputs are being combined as a linear combination. The constants $k_1$ are unknown to the integrity verification process 400. Thus, the integrity verification process 400 must insure that the inequality of Equation 1 holds true for all choice of $k_i$ and if the integrity verification process 400 can do so, then the data processing system operates within an acceptable integrity threshold and is proven to be safe.

By way of an example as applied to the WAAS 100, the inputs to the integrity verification process 400 could be corrections and integrity data from the corrections processors 131 and the integrity verification process 400 in the system 100 can operate to bound the overall error in an estimation problem. In the WAAS 100 as explained above, the system provides corrections and integrity data to aircraft users 130 via the satellite broadcast 145, 155 for each source of error that, in the WAAS system, can include satellite orbit errors, satellite clock synchronization errors, and ionospheric signal delay errors. The users 130 apply the corrections to GPS satellite measurements to determine the position of the aircraft 130. Using the postulate of the inequality above, the integrity verification process 400 can combine the integrity data for each correction (i.e., for each error source correction) to produce a protection limit or acceptable integrity threshold and if the error in the corrections exceeds the protection limit or the acceptable integrity threshold, then a hazardous situation could arise and the aircraft 130 is instructed to not rely on the corrections information and is thus unable to use the GPS system for navigational purposes during a time in which the system 100 operates beyond the acceptable integrity threshold.

It is to be understood that while the integrity verification process 400 is illustrated as existing within each WMS in the example illustrated in FIG. 1, the integrity verification process 400 can equally be implemented in other areas of the system 100. Likewise, it is to be understood that embodiments of the invention need not operate in real-time to verify the operational integrity of the system such WAAS. As such, in alternative configurations, the mechanisms and techniques of the invention can be applied to sample data collected by testing operation of a system. Embodiments of the invention can then apply the integrity verification processing techniques disclosed herein in order to prove that the system operates according to an acceptable integrity threshold no matter what future inputs the system 100 receives.

Figure 2:
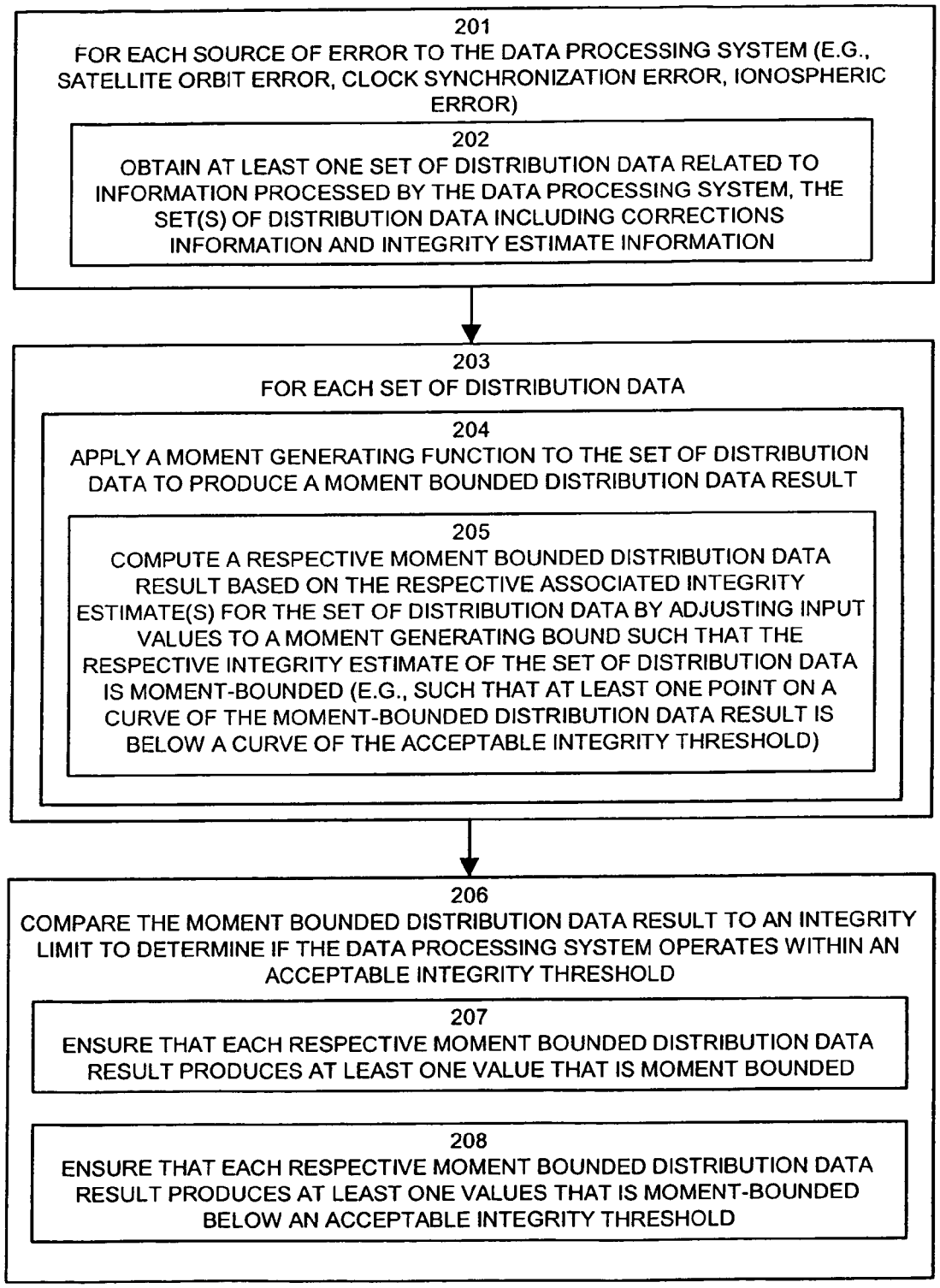
FIG. 2 is a flow chart of processing steps performed by an integrity verification process configured in accordance with one example embodiment of the invention.

FIG. 2 is a flow chart of processing steps that illustrate operation of the integrity verification process 400 according to one example embodiment of the invention.

In step 201, the integrity verification process 400 begins operation of a processing loop for each different source of error that exists to the data processing system 100 (e.g., in the WAAS 100). In particular, sources of error to the WAAS 100 can include satellite orbit error, satellite clock synchronization error and/or ionospheric error.

In step 202, for each source of error (i.e., for each iteration of step 201) the integrity verification process 400 obtains at least one set of distribution data related to information processed by the data processing system 100. The set of distribution data includes corrections information and integrity estimate information. With respect to the system 100, the distribution data can contain, for example, corrections information for a particular source of error along with integrity estimate information relating to the integrity or confidence of the corrections information for that error source.

Next, in step 203, the integrity verification process 400 operates to process each set of distribution data (i.e., for each different source of error) in step 204 and 205.

In step 204, the integrity verification process 400 applies a moment generating function to the set of distribution data to produce a moment bounded distribution data result.

In particular, as illustrated in detail in the processing of step 205, the integrity verification process 400 computes a respective moment bounded distribution data result based on the respective associated integrity estimates for the set of distribution data by adjusting input values to the moment generating function such that the respective integrity estimate of the set of distribution data is determined to be moment bounded. As will be explained shortly, input values to a moment bounding function produce a result that can be visualized in a graph in which at least one point on a curve of the moment bounded distribution data result is below a curve of the acceptable integrity threshold.

Figure 3:
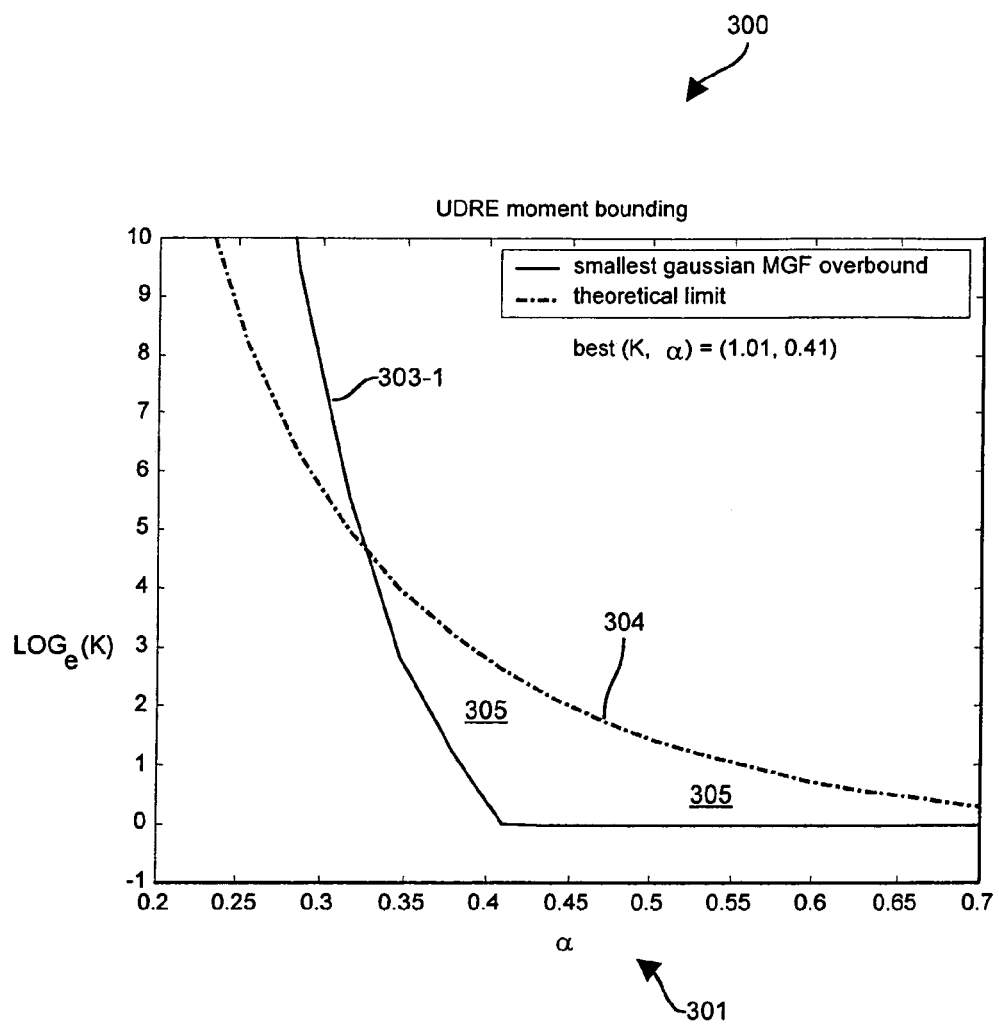
FIG. 3 is a graph that illustrates a curve of inputs used during an application of a moment generating function for a set of distribution data in comparison with a curve representing an acceptable integrity threshold.

Directing attention briefly ahead to FIG. 3, this figure illustrates an example graph 300 of a selection of input values K and a to the moment generation function that produce the curve 303-1 for a particular set of distribution data.

Returning to step 206 in FIG. 2, the integrity verification process 400 compares the moment bounded distribution data result to an integrity limit to determine if the data processing system operates within an acceptable integrity threshold.

In particular, as recited in step 207, the integrity verification process insures that each respective moment bounded distribution data result produces at least one value that is moment bounded by selection of proper input values to the moment generation function as will be explained. In one embodiment, the integrity limit thus represents a maximum value related to the collective set of errors represented within the set(s) of distribution data.

As also recited in step 208, the integrity verification process 400 insures that each respective moment bounded distribution data result (i.e., produced for each set of distribution data for each source of error) produces at least one value (i.e., a point on a curve in a graph) that is moment-bounded below an acceptable integrity threshold (i.e., represented by another curve).

Directing attention again to FIG. 3, as noted above, this example graph 300 shows a selection of input values K and α to the moment generation function that produce the curve 303-1 for a particular set of distribution data. The graph 300 also shows the curve 304 of the acceptable integrity threshold or integrity limit. As shown by the area designated at locations 305, there are numerous points along the moment bounded distribution data result 303-1 that fall below the acceptable integrity threshold curve 304. Accordingly, for the moment bounded distribution data result 303-1 for this particular set of distribution data, there is at least one point on the curve 303-1 that is below the curve 304 of the acceptable integrity threshold and as a result, for this particular set of distribution data, the integrity verification process 400 has verified that the data processing system 100 operates within acceptable integrity threshold.

In this manner, the operation of processing steps shown in FIG. 2 causes the integrity verification process 400 to verify the correct operational integrity of a data processing system 100 such as WAAS. Using the aforementioned definitions of terms presented with Equation 1 with respect to the WAAS 100, the random variables $J_1$ represent the error distribution in each satellite correction (e.g., for clock errors, orbit errors, and ionospheric errors). The values of $k_1$ are determined by a least squares processing technique and each user 130 has a particular set of k's that are determined by the users geometry with the GPS satellites 110, 150. Each of the sources of error has a respective set of associated integrity values $\sigma_{J_i}$ that represent an integrity limit associated with each $J_1$. The integrity limit from Equation 1 is:

$$K_{limit}\sqrt{\sum_{i=1}^{N}(k_i\sigma_1)^2}$$

and represents an integrity limit that accounts for combined error from each J within $J_1$ and is computed using a Root Sum Square (RSS) of the integrity values for each satellite. Generally, an aircraft user 130 uses the valves N=12 satellites and $K_{limit}$=5.33. The distribution of error for the aircraft user 130 can be computed by summing (i.e., convolving) the distributions of each satellite $$\left(\sum_{i=1}^{N} k_i J_i\right).$$

Accordingly, the integrity verification process 400 can operate to ensure that:

$$P\left(\left|\sum_{i=1}^{N} k_i J_i\right| > K_{limit}\sqrt{\sum_{i=1}^{N}(k_i\sigma_1)^2}\right) \leq 10^{-9}$$

If situations exist where the inequality is not met, adjustments can be made, for example, either to improve the accuracy of the data processing system 100, or increase the integrity estimates broadcast to the aircraft users 130.

As noted above in step 204, the integrity verification process 400 applies a moment generating function to the set of distribution data to produce a moment bounded distribution data result. Generally, a moment generating function of X, $m_x(t)$ is defined as:

$m_x(t)=E(e^{rX})=\int e^{ru}p_x(u)du$ where $p_x(u)$ is a probability density function of random variable X, such that X is (K, $\sigma^2$)-moment bounded if $m_x(t)$ exists and is $\leq K \cdot e^{t^2 \sigma^2/2}$ for all real numbers t. This definition is not provided by any conventional systems that relate to ensuring the operational integrity of a data processing system. However, definitions of particular moment generating functions that may be used in the aforementioned definition in place of X, $m_x(t)$ are readily available in mathematical literature.

Figure 4:
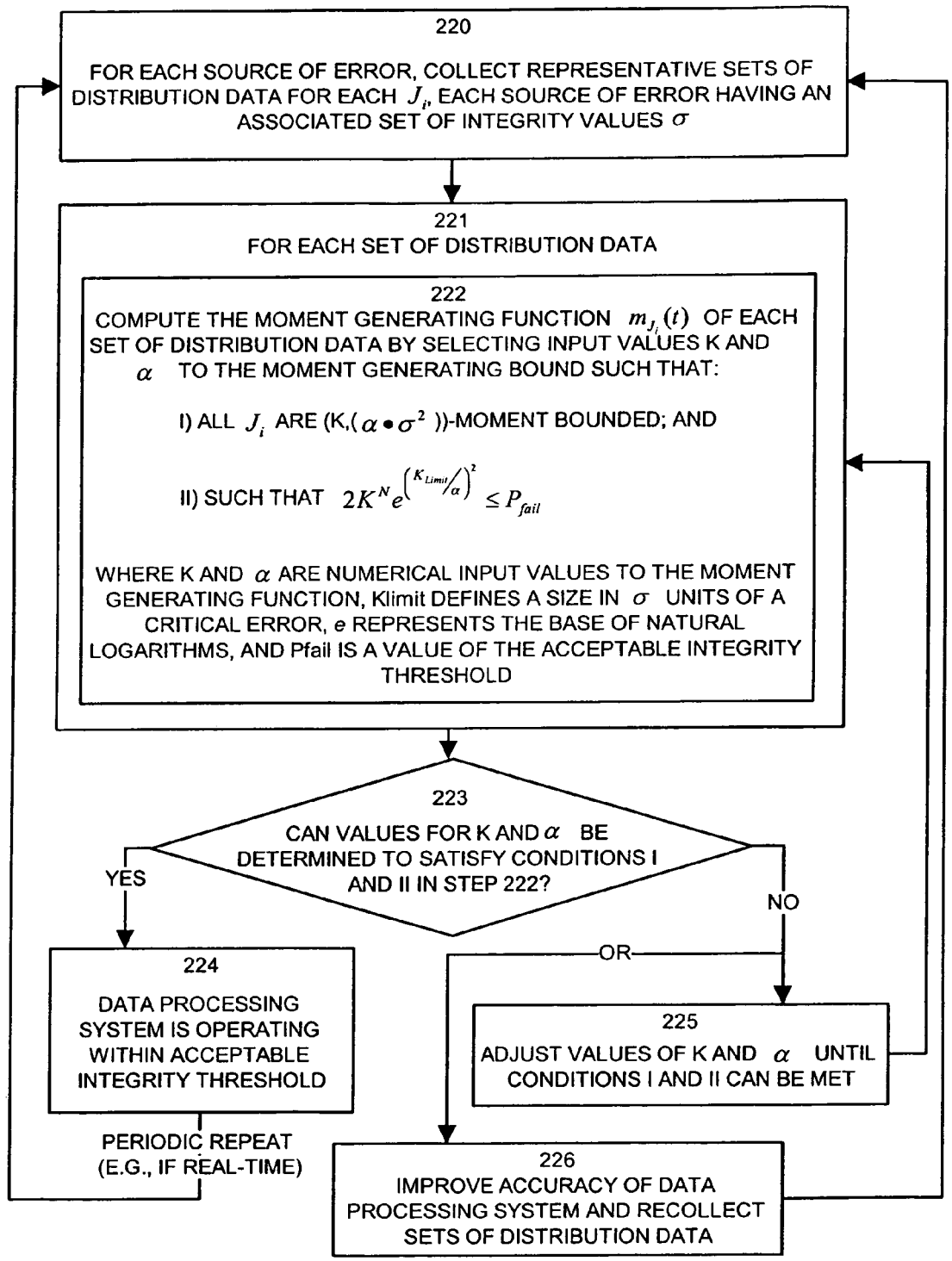
FIG. 4 is a flow chart of processing steps that illustrates a more detailed application of embodiments of the invention and applying a moment generating function to sets of distribution data.

FIG. 4 is a more detailed flow chart of processing steps that the integrity verification process 400 can perform to ensure that Equation 1 (above) holds for all combinations of $J_i$ and all choices of $k_1$. In other words, the processing steps in the embodiment of FIG. 4 show more detailed processing operations of the integrity verification process 400 that accomplishes the same objective as do the flow chart steps discussed above with respect to FIG. 2.

In step 220, the integrity verification process 400 enters a processing loop that occurs for each source of error (e.g., one or more of: orbit error, clock error, ionospheric error). In this loop, the integrity verification process 400 collects representative sets of distribution data for each $J_1$ and each source of error has an associated set of integrity values $\sigma_i$.

Figure 5:
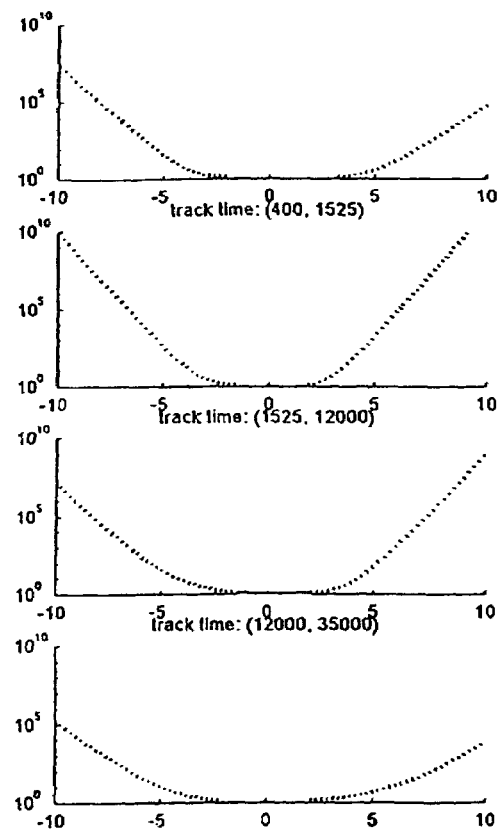
FIG. 5 illustrates example sets of distribution data for four sources of error in comparison with computed moment generating functions for each set of distribution data.
Figure 5:
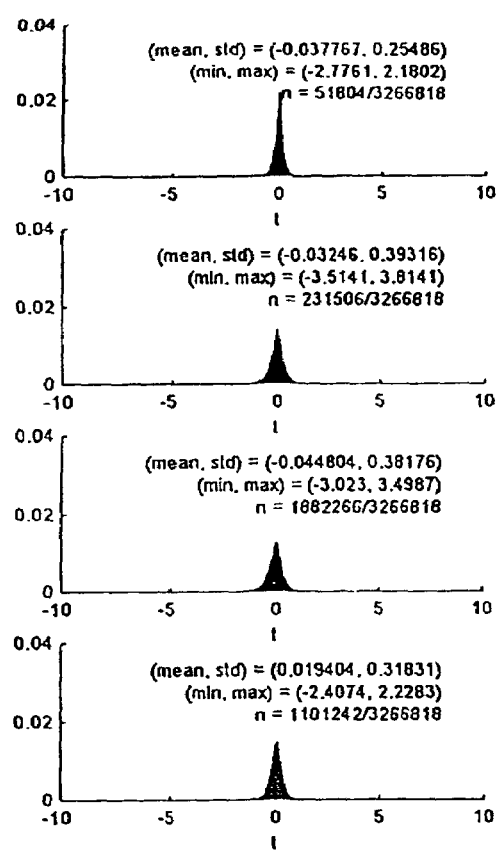

Directing attention briefly to FIG. 5, the four graphs 340 on the right hand side of this figure represent example respective graphs for four sets of distribution data for a particular satellite for a particular source of error.

Returning to the flow chart in FIG. 4, in step 221, the integrity verification process 400 enters another processing loop that operates for each set of distribution data.

In step 222, the integrity verification process computes the moment generation $m_{J_i}(t)$ of each set of distribution data. Returning attention back to FIG. 5, the graphs 330 on the left hand side of the figure represent respective moment generation functions as applied to the respective sets of distribution data shown by the graphs 330 on the right hand side of the figure. In the operation of step 222 in FIG. 4, the integrity verification process selects input values K and α to the moment generating function for a set of distribution data such that:

Condition I) that all $J_i$ are (K, ($\alpha \cdot \sigma^2$)-moment bounded; and Condition II) that $2K^N e^{(K_{Limit}/\alpha)^2} \leq P_{fail}$ are satisfied, where:

K and α are numerical input values to the moment generating function;

$K_{Limit}$ defines a size in σ units of a critical error;

e represents the base of natural logarithms; and and $P_{fail}$ is a value of the acceptable integrity threshold.

In other words, in step 222, during application of a moment generating function, the integrity verification process 400 selects input values K and α to the moment generating function such that a first condition that all input distributions in the at least one set of distribution data are moment-bounded is satisfied and such that a second condition that a root sum square of integrity estimates associated with each of the at least one set of distribution data are less than or equal to a probability of failure is also satisfied. The processing of step 222 is performed for each set of distribution data collected or otherwise obtained in step 220.

Figure 6:
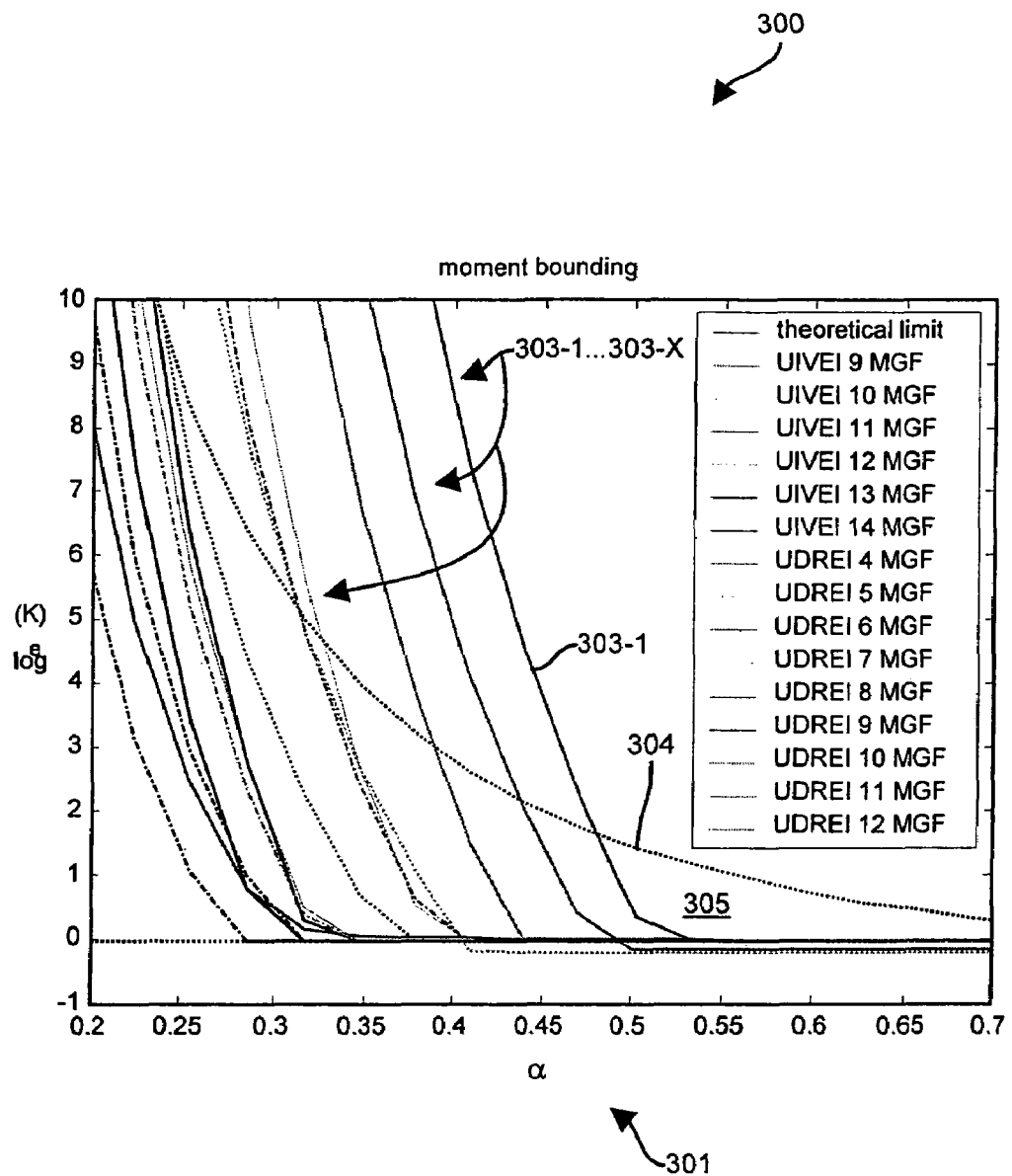
FIG. 6 is a graph that illustrates curves for each set of inputs used during application of a moment generating function to multiple sets of distribution data in comparison with a curve representing an acceptable integrity threshold.

Directing attention now to FIG. 6, this figure shows a graph 300 of curves 303-1 through 303-X of input values K and a to the moment generating function for twelve sets of distribution data. In other words, each curve 303 in the graph 300 in FIG. 6 shows the moment bounded distribution data result for one iteration of Condition I above. The Condition II above is shown by the curve 304, which represents input values K and α that correspond to the acceptable integrity limit.

Returning to the flow chart in FIG. 4, in step 223, the integrity verification process 400 determines if values for K and α can be determined to satisfy conditions I and II in step 222. In other words, the integrity verification process determines if there is an area 305 (in the graph 300 in FIG. 6) that exists below the acceptable integrity threshold curve 304 but above every moment bounded distribution data result curve 303. If in step 223 is determined that both conditions I and II are satisfied, processing proceeds to step 224.

In step 224, the integrity verification process 400 determines that the data processing system 100 is operating within acceptable integrity threshold. In other words, there exists some area 305 under the curve 304 and above all curves 303 in the graph 300 in FIG. 6. If the data processing system 100 is operating in conjunction with the integrity verification process 400 in a continuous or real-time manner, processing can proceed from step 224 back to step 220 at periodic intervals (e.g., at selected time intervals, or immediately) to continuously confirm or verify the data processing system 100 is operating according to acceptable integrity threshold.

Returning attention to step 223, if values for K and α cannot be determined to satisfy both of conditions I and II in step 222, processing proceeds either to step 225 or to step 226. In either case, if one or both of conditions I and II are not satisfied in step 222, then the integrity verification process 400 has determined that, based on current set of distribution data and associated integrity estimates, the data processing system 100 is not operating within acceptable integrity threshold (i.e., that area 305 in FIG. 6 does not exist).

In step 225, the integrity verification process can attempt to satisfy conditions I and II in step 222 by adjusting the values for K and α until conditions I and II in step 222 are met. Accordingly, processing of the integrity verification process 400 can be continually or iteratively performed until successful values for K and α can be determined. Alternatively, if no successful values for K and α can be determined in step 222, processing can proceed from step 223 to step 226.

In step 226 an operator of the data processing system or some other mechanism outside of the scope of the invention can attempt to improve the accuracy of the data processing system 100 and processing can return to step 220 in order to recollect new sets of distribution data based on the adjusted operation of the data processing system 100 in an attempt to improve its accuracy. In this manner, embodiments of the integrity verification process 400 are able to continually verify operational integrity of a data processing system 100 such as WAAS.

Figure 7:
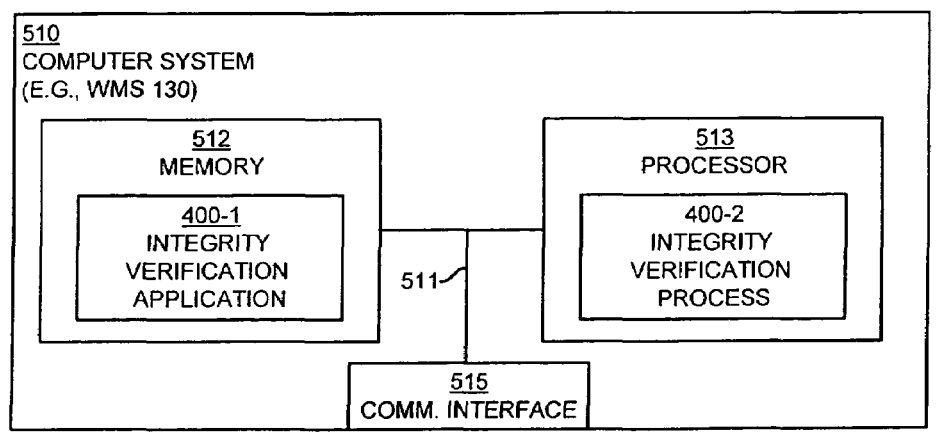
FIG. 7 illustrates an example architecture of a computerized device that operates in integrity verification process configured in accordance with embodiments of the invention.

FIG. 7 illustrates an example architecture of a computer system 510 that operates an integrity verification process 400-2 configured in accordance with embodiments of the invention. The computer system 510 includes an interconnection mechanism 511 that couples a memory system 512, a processor 513, and one or more communications interfaces 515. The memory 512 is any type of computer readable medium such as semiconductor memory (e.g., Random Access Memory—RAM or Read Only Memory—RAM), firmware memory, magnetic or optical storage or any other type of memory storage system. The memory 512 is encoded with logic instructions and/or data that form a integrity verification application 400-1. The processor 513 is any type of processing unit (e.g., microprocessor or central processing unit), controller, programmable gate array (PGA), application specific integrated circuit (ASIC) or the like that is capable of accessing and performing, executing, interpreting, running or otherwise operating the integrity verification application 400-1 encoded within the memory 512 to form the integrity verification process 400-2. That is, the integrity verification process 400-2 represents a runtime operation of integrity verification application 400-1. The computer system 510 can be included in a system such as WAAS or any other system to which this invention may be applied to confirm operational integrity of the system.

Those skilled in the art will understand that there can be many variations made to the embodiments explained above while still achieving the same objective of those embodiments and the invention in general. Such variations are intended to be covered by the scope of this invention. As such, the foregoing description of embodiments of the invention are not intended to be limiting.

What is claimed is:

1. A method for evaluating operational integrity of a data processing system, the method comprising the steps of:
   obtaining at least one set of distribution data related to information processed by the data processing system;
   applying a moment generating function to the at least one set of distribution data to produce a moment bounded distribution data result; and
   comparing the moment bounded distribution data result to an integrity limit, representing a maximum value related to the collective set of errors represented within the at least one set of distribution data, to determine if the data processing system operates within an acceptable integrity threshold.

2. The method of claim 1 wherein the at least one set of distribution data includes multiple sets of distribution data, each of which is at least one of:
   i) non-unimodal;
   ii) non-symmetric having a non-zero mean; and
   iii) distribution data collected from actual operation of the data processing system.

3. The method of claim 1 wherein:
   the distribution data includes at least one integrity estimate that forms a composite error bound; and
   wherein the steps of applying the moment bounding function and comparing the moment bounded distribution data result determine that every possible combination of errors represented within the distribution data is bounded by the at least one integrity estimate.

4. The method of claim 1 wherein:
   the data processing system is a signal-based navigation system;
   the at least one set of distribution data includes corrections information and integrity estimate information related to a location of a user of the signal-based navigation system;
   wherein the steps of applying a moment generating function and comparing the moment bounded distribution data result collectively perform a convolution analysis operation on the set of distribution data such that the moment generating function produces a resultant moment bounded distribution data result that ensures that combinations of errors represented in the integrity estimates and corrections information in the set of distribution data do not exceed the integrity limit that accounts for all combined errors in the set of distribution data obtained form the signal-based navigation system.

5. The method of claim 4 wherein the signal-based navigation system is at least one of a wide area augmentation system, a local area augmentation system, and a global navigation satellite system.

6. The method of claim 5 wherein the corrections information and integrity estimate information included in the set of distribution data relate to sources of navigation error in the signal-based navigation system that includes at least one of satellite orbit error, satellite clock error, and satellite signal ionospheric delay error.

7. The method of claim 1 comprising the step of:
   performing the steps of obtaining, applying and comparing during real-time operation of the data processing system; and
   wherein the step of obtaining comprises the step of:
      obtaining the at least one set of distribution data from real-time operation of the data processing system such that the steps of applying and comparing ensure that operation of the data processing system is within an acceptable integrity threshold.

8. The method of claim 1 comprising the steps of:
   performing the step of obtaining at least one set of distribution data during a real-time operation of the data processing system to collect at least one sample set of distribution data; and
   performing the steps of applying and comparing in non-real-time operation of the data processing system on the at least one sample set of distribution data to prove that the data processing system operates within an acceptable integrity threshold.

9. The method of claim 1 further comprising the steps of:
   applying a Gaussian distribution function to the at least one set of distribution data to produce a Gaussian bounded distribution data result; and
   comparing the Gaussian bounded distribution data result to an integrity limit to determine if the data processing system operates within an acceptable integrity threshold.

10. The method of claim 1 further comprising the steps of:
    applying a overbounding distribution function to the at least one set of distribution data to produce an overbounded bounded distribution data result; and
    comparing the overbounded bounded distribution data result to an integrity limit to determine if the data processing system operates within an acceptable integrity threshold.

11. The method of claim 1 wherein the step of obtaining at least one set of distribution data comprises the steps of:
    operating the data processing system to produce a plurality of sets of distribution data, each having a respective associated integrity estimate;
    and wherein the step of applying the moment generating function comprises the step of:
    computing a respective moment bounded distribution data result based on the respective associated integrity estimate for each of the plurality of sets of distribution data by adjusting input values to the moment generating function such that the respective integrity estimate of each set of distribution data is moment-bounded;
    and wherein the step of comparing the moment bounded distribution data result to an integrity limit comprises the steps of:
      ensuring that each respective moment bounded distribution data result produces at least one value that is moment-bounded;
      ensuring that each respective moment bounded distribution data result produces at least one value that is moment-bounded below the acceptable integrity threshold.

12. The method of claim 1 wherein the step of applying a moment generation function comprises the steps of:

selecting input values to a moment generating bound such that a first and a second condition are both satisfied, wherein:
i) the first condition is that all input distributions in the at least one set of distribution data are moment-bounded; and
ii) the second condition is that a root sum square of integrity estimates associated with each of the at least one set of distribution data are less than or equal to a probability of failure.

13. The method of claim 12 wherein the step of comparing comprises the step of:
determining that the data processing system operates within an acceptable integrity threshold if a first probability that a sum of the at least one set of distribution data is less than an integrity limit that accounts for combine errors within the at least one set of distribution data, is less than the probability of failure associated with the acceptable integrity threshold.

14. The method of claim 12 wherein the steps of applying a moment generation function and comparing the moment bounded distribution data result to an integrity limit collectively determine that:

$$P\left(\left|\sum_{i=1}^{N} k_i J_i\right| > K_{limit}\sqrt{\sum_{i=1}^{N}(k_i\sigma_1)^2}\right) \leq P_{fail}$$

where:
P is a probability function;
$J_i$ represents a set of distribution data;
N is a number of individual inputs J;
$k_i$ is a set of N real numbers;
$\sigma_i$ represents an integrity limit associated with each $J_i$; and
$P_{fail}$ represents the probability of failure associated with the acceptable integrity threshold.

15. The method of claim 14 wherein $$K_{limit}\sqrt{\sum_{i=1}^{N}(k_i\sigma_1)^2}$$

is an integrity limit that accounts for combined error from each J within $J_i$.

16. The method of claim 14 wherein the step of applying a moment generating function to the at least one set of distribution data to produce moment bounded distribution data result comprises the step of:
applying a moment generating function of X, $m_x(t)$ defined as:
$m_x(t)=E(e^{tx})=\int e^{tu} p_x(u)du$ where $P_x(u)$ is a probability density function of random variable X, such that X is (K, $\sigma^2$)-moment bounded if $m_x(t)$ exists and is $\leq K \cdot e^{t^2\sigma^2/2}$ for all real numbers t.

17. The method of claim 1 wherein:
there exists at least one source of error to the data processing system;
there are sets of distribution data, $J_i$, that represent input to the data processing system that are collected for each respective source of error to the data processing system;
each of the at least one source of error has a set of respective set of associated integrity values $\sigma_j$, that represent an integrity limit associated with each $J_i$;

and wherein the step of applying a moment generation function to the at least one set of distribution data comprises the step of:
computing the moment generating function $m_j(t)$ of each set of distribution data and selecting input values K and $\alpha$ to a moment generating bound such that:
i) all $J_i$ are (K, ($\alpha \cdot \sigma^2$)-moment bounded; and
ii) such that $2K^N e^{(K_{Limit}/\alpha)^2} \leq P_{fail}$, where:
K and $\alpha$ are numerical input values to the moment generating bound;
$K_{Limit}$ defines a size in a $\sigma$ units of a critical error;
e represents the base of natural logarithms; and
and $P_{fail}$ is a value of the acceptable integrity threshold.

18. A computer system comprising:
a communications interface;
a memory;
a processor; and
an interconnection mechanism coupling the communications interface, the memory and the processor;
wherein the memory is encoded with an integrity verification application that when performed on the processor, produces an integrity verification process that causes the computer system to evaluate operational integrity of a data processing system by performing the operations of:
obtaining at least one set of distribution data related to information processed by the data processing system;
applying a moment generating function to the at least one set of distribution data to produce a moment bounded distribution data result; and
comparing the moment bounded distribution data result to an integrity limit, representing a maximum value related to the collective set of errors represented within the at least one set of distribution data, to determine if the data processing system operates within an acceptable integrity threshold.

19. The computer system of claim 18 wherein:
the data processing system is a signal-based navigation system;
the at least one set of distribution data includes corrections information and integrity estimate information related to a location of a user of the signal-based navigation system;
wherein the steps of applying a moment generating function and comparing the moment bounded distribution data result collectively cause the processor to perform a convolution analysis operation on the set of distribution data such that the moment generating function produces a resultant moment bounded distribution data result that ensures that combinations of errors represented in the integrity estimates and corrections information in the set of distribution data do not exceed the integrity limit that accounts for all combine errors in the set of distribution data obtained form the signal-based navigation system.

20. The computer system of claim 18 wherein when the integrity verification process causes the computer system to perform the steps of applying a moment generation function and comparing the moment bounded distribution data result to an integrity limit, the integrity verification process causes the computer system to determine that:

$$P\left(\left|\sum_{i=1}^{N} k_i J_i\right| > K_{limit} \sqrt{\sum_{i=1}^{N} (k_i \sigma_1)^2}\right) \le P_{fail}$$

where:
P is a probability function;
$J_i$ represents a set of distribution data;
N is a number of individual inputs J;
$k_i$ is a set of N real numbers;
$\sigma_i$ represents an integrity limit associated with each $J_i$; and
$P_{fail}$ represents the probability of failure associated with the acceptable integrity threshold.

21. A computer system comprising:
a communications interface;
a memory;
a processor; and
an interconnection mechanism coupling the communications interface, the memory and the processor;
wherein the memory is encoded with an integrity verification application that when performed on the processor, produces an integrity verification process that provides a means for the computer system to evaluate operational integrity of a data processing system, such means including:
means for obtaining at least one set of distribution data related to information processed by the data processing system;
means for applying a moment generating function to the at least one set of distribution data to produce a moment bounded distribution data result; and
means for comparing the moment bounded distribution data result to an integrity limit to determine if the data processing system operates within an acceptable integrity threshold.

22. A computer program product having a computer-readable medium including computer program logic encoded thereon that, when performed on a computer system having a coupling of a memory and a processor provides a method for the computer system to evaluate operational integrity of a data processing system by performing the operations of:
obtaining at least one set of distribution data related to information processed by the data processing system;
applying a moment generating function to the at least one set of distribution data to produce a moment bounded distribution data result; and
comparing the moment bounded distribution data result to an integrity limit to determine if the data processing system operates within an acceptable integrity threshold.

23. The method of claim 1 wherein the steps of applying a moment generating function and comparing the moment bounded distribution data result collectively perform a convolution analysis operation on the set of distribution data such that the moment generating function produces a resultant moment bounded distribution data result.

24. The method of claim 1, wherein applying the moment generating function includes:
applying a moment generating function, which is based on a corresponding probability density function, to the at least one set of distribution data to produce the moment bounded distribution data result.

25. The method of claim 1 wherein the step of obtaining at least one set of distribution data includes operating the data processing system to produce a plurality of sets of distribution data, each having a respective associated integrity estimate.

26. The method of claim 1, wherein applying the moment generating function includes:
computing a respective moment bounded distribution data result based on the respective associated integrity estimate for each of the plurality of sets of distribution data by adjusting input values to the moment generating function such that the respective integrity estimate of each set of distribution data is moment-bounded.

27. The method of claim 1, comparing the moment bounded distribution data result to an integrity limit includes:
ensuring that each respective moment bounded distribution data result produces at least one value that is moment-bounded; and
ensuring that each respective moment bounded distribution data result produces at least one value that is moment-bounded below the acceptable integrity threshold.

28. The method as in claim 1, wherein comparing the moment bound distribution data result includes comparing the moment bound distribution data result to an integrity limit maximum value that represents a maximum value of convolved errors in the at least one set of distribution data.

29. The method as in claim 1, wherein applying the moment generating function includes computing the moment bounded distribution data result based on a respective associated integrity estimate for the at least one set of distribution data by adjusting input values to the moment generating function such that the integrity estimate of the at least one set of distribution data is determined to be moment bounded.

30. The method of claim 1 further comprising:
initiating an integrity verification process that ensures that the moment bounded distribution data result produces at least one value that is moment bounded by selection of proper input values to the moment generating function.

31. The method of claim 1 wherein the step of comparing includes:
determining that the data processing system operates within an acceptable integrity threshold if a first probability that a sum of the at least one set of distribution data is less than an integrity limit that accounts for combined errors within the at least one set of distribution data, is less than the probability of failure associated with the acceptable integrity threshold.

32. The computer system of 18, wherein the moment generating function is a mathematical function based at least in part on a corresponding probability distribution function and the computer system further supports operations of:
performing the steps of applying and comparing on the at least one sample set of distribution data to prove that the data processing system operates within an acceptable integrity threshold.

* * * * *

UNITED STATES PATENT AND TRADEMARK OFFICE
CERTIFICATE OF CORRECTION

PATENT NO.        : 7,089,452 B2
APPLICATION NO.   : 10/255029
DATED             : August 8, 2006
INVENTOR(S)       : Arthur Leonard Rubin and Timothy Robert Schempp It is certified that error appears in the above-identified patent and that said Letters Patent is hereby corrected as shown below:

Claim 17, Column 21, Line 66, " $\sigma_{J_i}$ " should read -- $\sigma_{J_i}$ --.

Claim 17, Column 22, Line 12, "in a σ" should read -- in σ --.

Signed and Sealed this

Fourteenth Day of November, 2006

JON W. DUDAS
*Director of the United States Patent and Trademark Office*